United States Patent [19]

Knuth

[11] 4,043,367
[45] Aug. 23, 1977

[54] REMOVABLE CUTTING ELEMENTS
[76] Inventor: Eugene W. Knuth, Land O Lakes, Wis. 54540
[21] Appl. No.: 659,118
[22] Filed: Feb. 18, 1976
[51] Int. Cl.² .......................................... B27B 21/00
[52] U.S. Cl. ............................................ 145/31 R
[58] Field of Search .......... 145/31 R, 31 AB, 31 AC, 145/31 AD

[56] References Cited

U.S. PATENT DOCUMENTS

| | | | |
|---|---|---|---|
| 865,989 | 9/1907 | Bayless | 145/31 R |
| 1,712,008 | 5/1929 | Rice | 145/31 AD |
| 1,956,587 | 5/1934 | Parker et al. | 30/349 |
| 1,956,588 | 5/1934 | Parker et al. | 30/349 X |
| 2,403,027 | 7/1946 | Shoultz | 145/31 R |
| 2,546,947 | 3/1951 | Miller | 145/31 R |
| 3,837,024 | 9/1974 | Saunders | 7/8.1 R |
| 3,946,778 | 3/1976 | Knuth | 145/31 A |

Primary Examiner—James L. Jones, Jr.
Assistant Examiner—J. T. Zatarga
Attorney, Agent, or Firm—Edwin E. Greigg

[57] ABSTRACT

Disclosed herein are a plurality of cutting elements for use with sawing devices that are replaceable, provide a variety of cutting edges, and are retained on the saw body in a plurality of ways. Specifically disclosed is a cutting element whose working edge comprises two thin sharp parallel knife edges or alternatively very fine saw teeth. The means by which these edges are retained on the saw structure include ball and detent retention, spring biased resistance means, tongue and groove meeting surfaces, dovetailed inserts and the like.

2 Claims, 9 Drawing Figures

FIG. 6
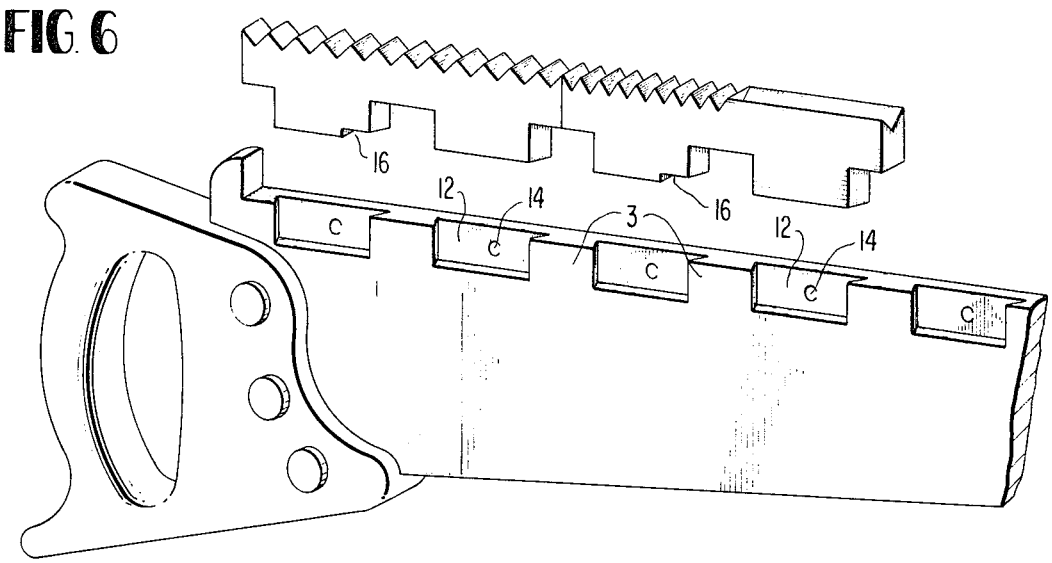
FIG. 7
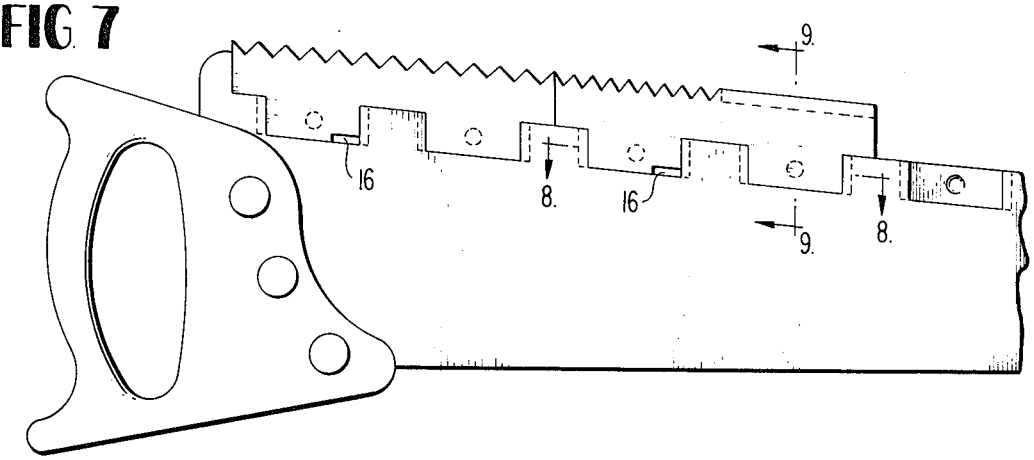
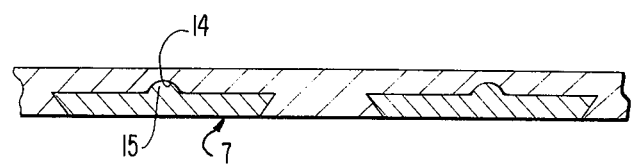
FIG. 8
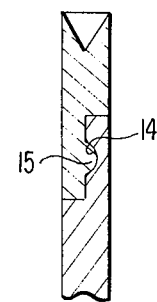
FIG. 9

REMOVABLE CUTTING ELEMENTS

BACKGROUND OF THE INVENTION

Hand saws have traditionally been troublesome to use when first making the initial cut on an object. Frequently, the saw exhibits the tendency to jump sideways away from the scribed line where it is desired to make the saw cut, because the saw's coarse teeth tend to resist accurate placement on the line which is to be cut. Additional problems include having the saw dig into the wood too deeply on the first pass thereby stalling the saw, or even worse having the saw tear bits of wood from the board's edge at the sides of the cut.

OBJECTS AND SUMMARY OF THE INVENTION

Accordingly, one object of the invention is to provide a saw structure having superior sawing characteristics over blades of the prior art. Additionally, it is a further object of the invention to provide a sawing surface comprised of a variety of cutting elements having different degrees of coarseness to accomodate wood cutting or any other article cutting as a function of progressive steps utilizing different blades.

It is a further object of this invention to provide a sawing surface which has elements that are easily removable without the need of special tools to provide flexibility in choosing which saw toothed configuration is most desirable for the object to be cut.

Other objects and advantages will become apparent from the following detailed description of the preferred embodiment illustrated in the accompany drawing in which:

BRIEF DESCRIPTION OF THE DRAWING

FIG. 6 shows an additional embodiment of a cutting element as contrasted with that in FIG. 1;

FIG. 7 shows the cutting element of FIG. 6 in its inserted state;

FIG. 8 shows a sectional view of the saw in FIG. 7 taken along lines 8—8; and

FIG. 9 shows an end view of the cutting element seen in FIG. 7 along the lines 9—9.

DESCRIPTION OF THE PREFERRED EMBODIMENTS

Figure 1:
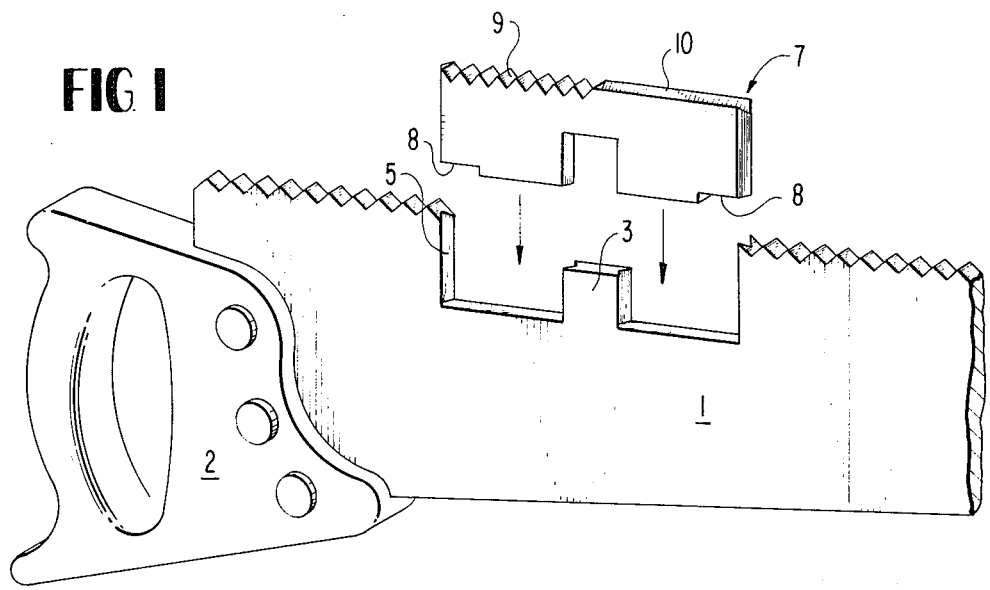
FIG. 1 shows a saw structure with the cutting element removed.
Figure 2:
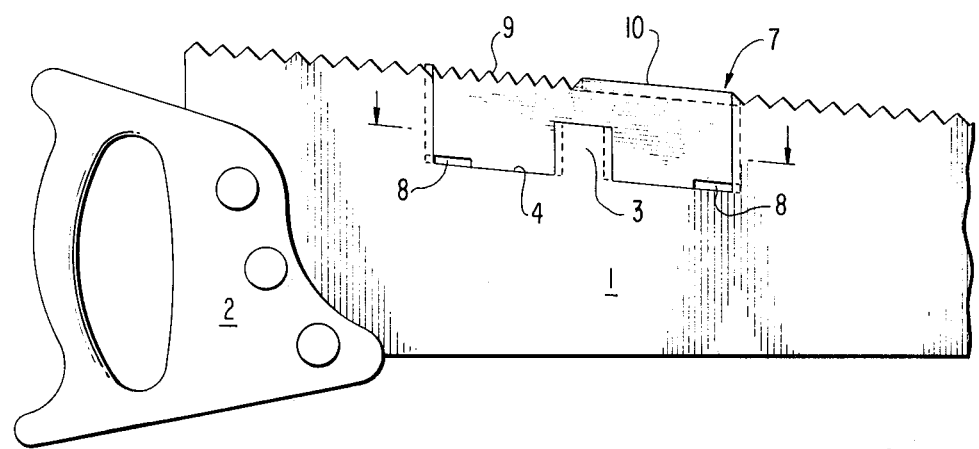
FIG. 2 shows a saw structure with the cutting element inserted.
Figure 3:
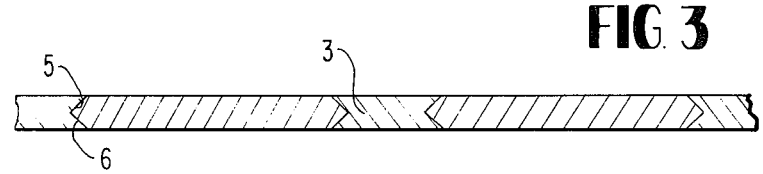
FIG. 3 shows a sectional view of the retention of a cutting element in the structure taken along the lines 3—3 of FIG. 2.

Referring to FIG. 1, there is shown a saw body 1 attached to a handle 2 in which the cutting surface along the top edge of the saw body has removable cutting elements which fit into a recessed area. Cutting element 7 may generally be regarded as a rectangular cutting section with a few notable exceptions: there is a rectangular cut-away portion on the lower edge of this rectangular cutting element which corresponds to upstanding projection or interlocking tang 3 of saw body 1 as best viewed in FIG. 2. Further, cutting element 7 when disposed in the appropriate slot of saw body 1 provides a close machined fit, and the fit between this cutting element and the saw body may be characterized a follows: along wall surface 5 of body 1 there is a tongue and groove type of interlocking surface partions as well as along the vertical legs of upstanding projection 3. The horizontal lines of tangency between the saw body and the cutting element are contrasted from the tongue and groove arrangement by being substantially linear not only on the lower extremity of the saw body but also the top surface of the upstanding projection 3. Further, it will be appreciated that cutting element 7 has two diverse types of cutting surfaces as contrasted with the cutting edge of the rest of the saw body. That is to say, cutting surface 9 is of conventional saw toothed configuration but is not as coarse as the saw tooth configuration of the main saw body, and the cutting section denoted by numeral 10 can be characterized as two parallel knife edges. These knife edges although shown to be linear in FIGS. 1 and 2, could conceivably be serrated. Further, FIG. 1 shows open areas 8 at either extremity of the cutting element 7 to provide a point of leverage whereby a small screw driver or prying utensil may be used to remove the cutting element from the saw body. FIG. 3 shows with greater specificity the tongue and groove arrangement described in FIG. 1.

Figure 4:
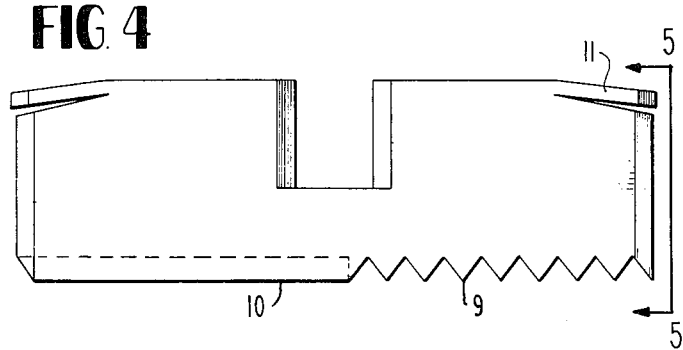
FIG. 4 shows an alternative embodiment of the retention mechanism depicted in FIGS. 1 and 2.
Figure 5:
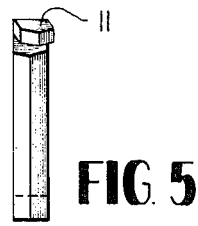
FIG. 5 shows a side view of the embodiment depicted in FIG. 4 taken along lines 5—5.

FIGS. 4 and 5 shows a similar cutting element; however, having a different means of retention. Spring projection 11 extends outwardly slightly beyond the extent of the cutting element and retention of this element is effected by this spring biasing against the surface 5 shown in FIG. 1. An additional view (FIG. 5) taken along the side of FIG. 4 along lines 5—5 better depicts the spring projection 11 seen in FIG. 4.

FIGS. 6-9 shows an additional embodiment which can be characterized in that the upstanding projections 3 do not extend clear through the saw body and rather are allowed to communicate with subsequent upstanding projections by means of wall member 12. The cutting element is complementally formed to approximate the configuration of the upstanding projection and wall member and additionally is provided with a ball and detent retention system and is shown in FIGS. 6, 7, 8 and 9. Wall member 12 is provided with a detent 14 to receive a ball 15 located on the back face of cutting element 7 depicted in FIG. 8. Of course, an alternative arrangement could be effected in which the detent 14 is located on the cutting element. As in the other embodiments this cutting element can be removed from the saw body by means of prying with the tip of a screw driver along the edge at point 16.

In practice, the knife edges are placed on the cutting surface over the line scribed for the cut and then pressed down onto the cutting surface thus forming two parallel knife cuts to serve as a track for the fine teeth in this combination knife edge-fine tooth section. These fine teeth cut a clean and accurate shallow starting kerf or track for the regular coarser teeth of the saw to follow in.

In addition to the ball and detent retention system, as well as the spring biased projection and groove and channel retention means, it is also contemplated to be within the concept of this invention to use dovetailing fingers extending from the insert into the saw body or vice versa as means for retaining this cutting element in the saw body.

What is claimed is:

1. A saw body comprising parallel planar wall portions having at least one cutting surface along one edge thereof, said cutting surface having a recessed area of substantially rectangular configuration with a planar edge parallel to said cutting surface and V-shaped walls extending orthogonally from said planar edge to said cutting surface, an upwardly extending substantially rectangular tang medially disposed on said planar edge with V-shaped walls and a planar top portion, and a cutting element disposed in said recessed area overlying said tang having a cutting surface on its top edge, V-shaped walls on its side edges to tangentially contact the V-shaped walls of said recessed area and said tang, and spring projections on its substantilly planar bottom edge to further grip the walls of said recessed area.

2. The apparatus of claim 1 in which said cutting surface of said cutting element comprises a first portion of conventional but finer tooth configuration than a coarser tooth configuration of said saw body, and a second portion comprising two parallel knife edges, whereby said second and said first portions respectively serve to provide progressively deeper starting kerfs in which the cutting surface of said saw body sequentially follows.

* * * * *